US012662322B2

(12) United States Patent
Wu et al.

(10) Patent No.: US 12,662,322 B2
(45) Date of Patent: Jun. 23, 2026

(54) CONVEYOR SYSTEMS, ADJUSTMENT MECHANISMS, AND METHODS OF USE

(71) Applicant: INTELLIGRATED HEADQUARTERS, LLC, Mason, OH (US)

(72) Inventors: Baichuan Wu, Charlotte, NC (US); Yun Li, Charlotte, NC (US); Yusheng Qiu, Charlotte, NC (US); Shun Li, Charlotte, NC (US)

(73) Assignee: Intelligrated Headquarters, LLC, Mason, OH (US)

( * ) Notice: Subject to any disclaimer, the term of this patent is extended or adjusted under 35 U.S.C. 154(b) by 61 days.

(21) Appl. No.: 18/737,374

(22) Filed: Jun. 7, 2024

(65) Prior Publication Data

US 2024/0425293 A1 Dec. 26, 2024

(30) Foreign Application Priority Data

Jun. 21, 2023 (CN) .......................... 202310744732.0

(51) Int. Cl.
*B65G 17/34* (2006.01)
*B65G 47/94* (2006.01)
*B65G 47/96* (2006.01)

(52) U.S. Cl.
CPC ............ *B65G 17/345* (2013.01); *B65G 47/94* (2013.01); *B65G 47/96* (2013.01)

(58) Field of Classification Search
CPC ....... B65G 17/345; B65G 47/94; B65G 47/96
USPC ......................................... 198/370.01–370.6
See application file for complete search history.

(56) References Cited

U.S. PATENT DOCUMENTS

| | | | | |
|---|---|---|---|---|
| 6,009,992 A * | 1/2000 | Erceg | ................... | B65G 47/962 |
| | | | | 198/370.04 |
| 6,736,254 B1 | 5/2004 | Fortenbery et al. | | |
| 6,899,217 B1 * | 5/2005 | Fortenbery | .......... | B65G 47/962 |
| | | | | 198/370.04 |

(Continued)

FOREIGN PATENT DOCUMENTS

| | | | | |
|---|---|---|---|---|
| CN | 114988029 A | 9/2022 | | |
| EP | 2218661 A1 * | 8/2010 | ............. | B65G 39/20 |
| EP | 3053858 A1 | 8/2016 | | |

OTHER PUBLICATIONS

Extended European Search Report Mailed on Oct. 15, 2024 for EP Application No. 24177432, 8 page(s).

*Primary Examiner* — Mark A Deuble
(74) *Attorney, Agent, or Firm* — Alston & Bird LLP

(57) ABSTRACT

Methods, systems, mechanisms, and/or the like are provided. According to various embodiments, there is provided a conveyor system including a track defining a track length; two or more conveyor segments, wherein each conveyor segment including: a belt; a frame configured to support the belt; a hitch configured to operably connect the two or more conveyor segments; an adjustment point, wherein each conveyor segment defines a conveyor length; and an adjustment mechanism including a plurality of surfaces, wherein at least one of the plurality of surfaces is a nonconcentric surface, wherein the nonconcentric surface is configured to operably engage with the adjustment point such that the adjustment mechanism may be rotated in a first direction to increase the conveyor length by one increment and in a second direction to decrease the conveyor length by one increment.

13 Claims, 16 Drawing Sheets

(56) References Cited

U.S. PATENT DOCUMENTS

| 9,233,803 | B2 * | 1/2016 | Pilarz | .................... | B65G 17/345 |
| 9,376,271 | B2 * | 6/2016 | Fujio | ...................... | B65G 21/22 |
| 10,532,895 | B1 | 1/2020 | Best | | |
| 10,604,349 | B2 | 3/2020 | Lykkegaard | | |
| 10,669,104 | B2 * | 6/2020 | Fujio | ...................... | B65G 35/06 |
| 2004/0094391 | A1 | 5/2004 | Schaum et al. | | |
| 2012/0012438 | A1 | 1/2012 | Heitplatz | | |
| 2017/0184176 | A1 | 6/2017 | Close et al. | | |
| 2018/0362258 | A1 | 12/2018 | Lykkegaard | | |

* cited by examiner

"0"

"+"

300

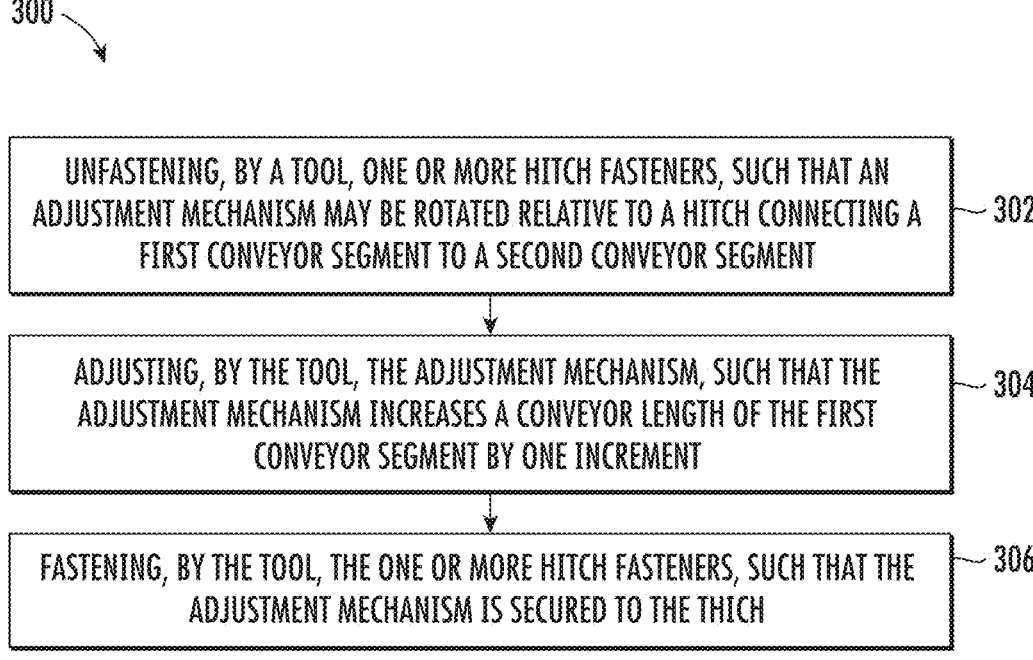

UNFASTENING, BY A TOOL, ONE OR MORE HITCH FASTENERS, SUCH THAT AN ADJUSTMENT MECHANISM MAY BE ROTATED RELATIVE TO A HITCH CONNECTING A FIRST CONVEYOR SEGMENT TO A SECOND CONVEYOR SEGMENT — 302

ADJUSTING, BY THE TOOL, THE ADJUSTMENT MECHANISM, SUCH THAT THE ADJUSTMENT MECHANISM INCREASES A CONVEYOR LENGTH OF THE FIRST CONVEYOR SEGMENT BY ONE INCREMENT — 304

FASTENING, BY THE TOOL, THE ONE OR MORE HITCH FASTENERS, SUCH THAT THE ADJUSTMENT MECHANISM IS SECURED TO THE THICH — 306

FIG. 6

CONVEYOR SYSTEMS, ADJUSTMENT MECHANISMS, AND METHODS OF USE

CROSS-REFERENCE TO RELATED APPLICATIONS

This application claims priority pursuant to 35 U.S.C. 119(a) to Chinese Application No. 202310744732.0, filed Jun. 21, 2023, which application is incorporated herein by reference in its entirety.

TECHNICAL FIELD

The present disclosure relates generally to sorting devices. In particular, it relates to adjustment mechanisms for loop sorting devices.

BACKGROUND

Conveyor systems, such as cross-belt sorters, may be used in warehouses, distribution centers, and similar industrial environments to support, sort, and/or transport objects within that environment. However, depending on a variety of factors (e.g., the location where the conveyor system is installed), the length and/or orientation of the conveyor system may need to be adjusted for desired functioning. Further, there may be manufacturing errors during the fabrication of the conveyor system or errors in installation that may become apparent only when the conveyor system is being installed, which may also require the conveyor to be adjusted for proper functioning. Hence, there are a variety of instances in which the length of the conveyor system may need to be adjusted after installation.

Through applied effort, ingenuity, and innovation, Applicant has solved problems relating to adjusting loop sorting devices by developing solutions embodied in the present disclosure, which are described in detail below.

SUMMARY

In general, embodiments of the present disclosure provide conveyor systems, conveyor segments, adjustment mechanisms, and/or the like.

In accordance with various embodiments of the present disclosure, there is provided a conveyor system including: a track defining a track length; two or more conveyor segments, wherein each conveyor segment includes: a belt; a frame configured to support the belt; a hitch configured to operably connect the two or more conveyor segments; an adjustment point, wherein each conveyor segment defines a conveyor length; and an adjustment mechanism including a plurality of surfaces, wherein at least one of the plurality of surfaces is a nonconcentric surface, wherein the nonconcentric surface is configured to operably engage with the adjustment point such that the adjustment mechanism may be rotated in a first direction to increase the conveyor length by one increment and in a second direction to decrease the conveyor length by one increment.

In some embodiments, the hitch includes one or more slots, and the adjustment mechanism is disposed through one of the one or more slots.

In some embodiments, each conveyor segment further includes one or more hitch fasteners configured to fixedly attach the adjustment mechanism to the hitch.

In some embodiments, the conveyor system further includes a gauge having one or more gauge elements, wherein the one or more gauge elements are disposed on the hitch, wherein, when the adjustment mechanism is rotated in the first direction it points to a first gauge element of the one or more gauge elements, and, when the adjustment mechanism is rotated in the second direction it points to a second gauge element of the one or more gauge elements.

In some embodiments, the track length ranges between 2.5 and 3.5 meters.

In some embodiments, the conveyor length ranges between 1195 and 1205 millimeters.

In some embodiments, the increment is 1 millimeter.

In some embodiments, the adjustment mechanism has an eccentric design.

In some embodiments, the adjustment mechanism is installed in the conveyor system, the adjustment mechanism points to a third gauge element of the one or more gauge elements.

In some embodiments, the conveyor system is a cross-belt conveyor.

In some embodiments, the conveyor segment is a cart.

According to various embodiments, there is provided a method of using an adjustment mechanism, the method including: unfastening, by a tool, one or more hitch fasteners, such that an adjustment mechanism may be rotated relative to a hitch connecting a first conveyor segment to a second conveyor segment; adjusting, by the tool, the adjustment mechanism, such that the adjustment mechanism increases a conveyor length of the first conveyor segment by one increment; and fastening, by the tool, the one or more hitch fasteners, such that the adjustment mechanism is secured to the hitch.

In some embodiments, the method further includes unfastening, by the tool, the one or more hitch fasteners, such that the adjustment mechanism may be rotated relative to the hitch connecting the first conveyor segment to the second conveyor segment; adjusting, by the tool, the adjustment mechanism, such that the adjustment mechanism decreases the conveyor length of the first conveyor segment by one increment; and fastening, by the tool, the one or more hitch fasteners, such that the adjustment mechanism is secured to the hitch.

In some embodiments, the one increment is 1 millimeter.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 6 is a flow chart illustrating an example method of use for an example adjustment mechanism in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

According to various embodiments, individual segments (e.g., carts) of a conveyor system (e.g., a cross-belt conveyor system) may have their length increased or decreased using an adjustment mechanism. In some embodiments, an adjustment mechanism may be inserted into an adjustment slot on a hitch connecting two or more conveyor segments. In some embodiments, the adjustment mechanism may be secured to the hitch by one or more hitch fasteners, which may be loosened and/or removed to allow the adjustment mechanism to increase or decrease the length of the conveyor segment as desired. In some embodiments, once the length of the conveyor segment has been adjusted, the one or more hitch fasteners may be reattached to secure the adjustment mechanism.

In some embodiments, the adjustment mechanism may be an elongated, substantially cylindrical piece defining a plurality of surfaces. In some embodiments, the adjustment mechanism may have an eccentric design; that is, the adjustment mechanism may be non-concentric. In some embodiments, the adjustment mechanism may be coupled to a gauge allowing quick and efficient visual indication of when the adjustment has occurred.

Example Conveyor Systems

Figure 1A:
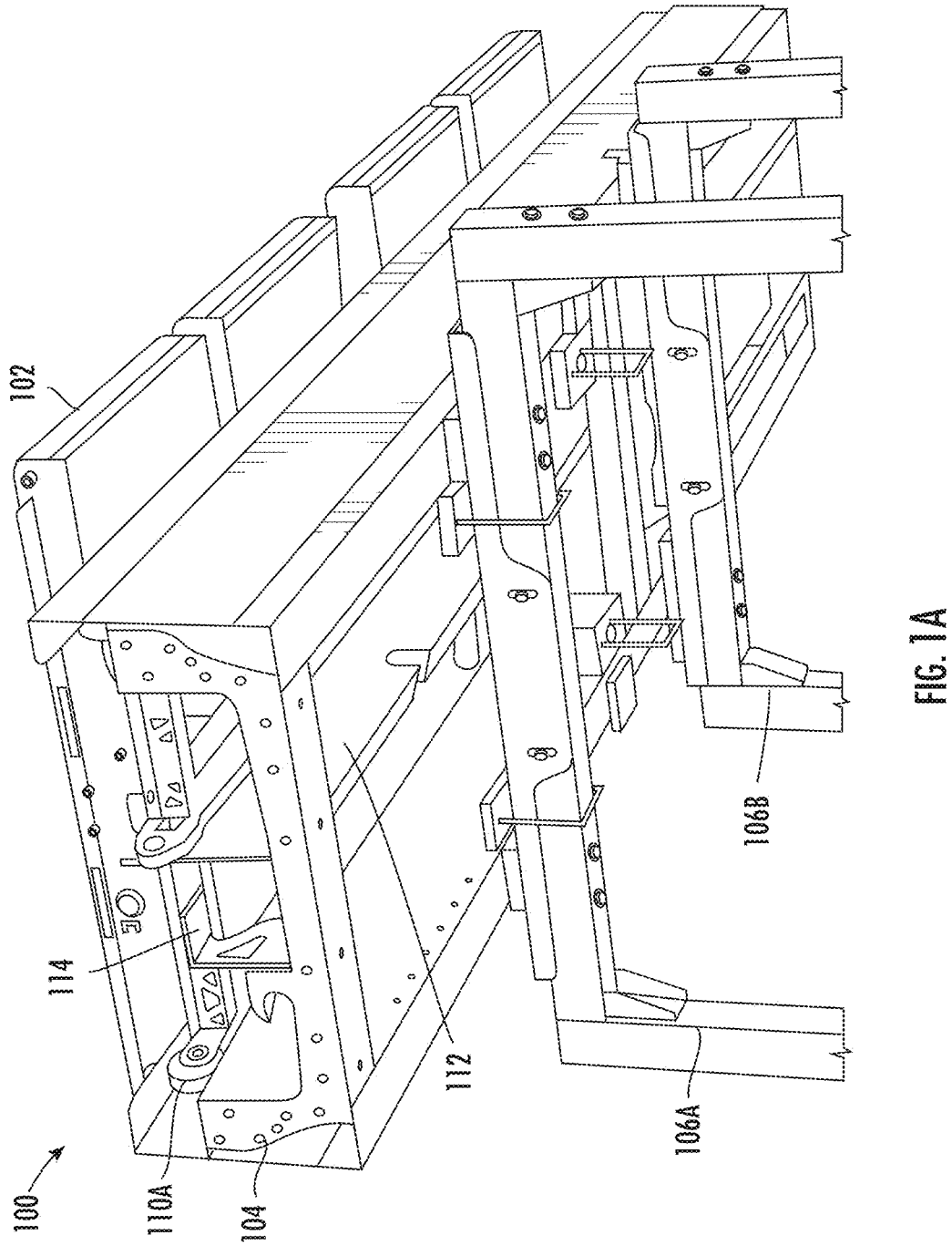
FIG. 1A is a bottom angle view of an example conveyor segment in accordance with various embodiments of the present disclosure.

FIG. 1A shows an example conveyor segment 100 in accordance with various embodiments of the present disclosure. In some embodiments, the conveyor segment 100 may be a component of a larger conveyor system 10 including multiple connected segments 100 (e.g., 100A, 100B, 100C, etc.) The following disclosure is described with respect to a single conveyor segment 100, but it will be understood that this description can apply similarly to multiple conveyor segments 100 within a larger conveyor system 10, as well as to the conveyor system 10 as a whole. In some embodiments, the conveyor system 10 may be configured to transfer goods in multiple directions throughout a space in which it is disposed. In some embodiments, the conveyor segment 100 may be configured (as part of the larger system) to support and/or transport one or more objects within a warehouse, distribution center, or similar industrial space. In some embodiments, the conveyor segment 100 may be part of a cross-belt sorter. In some embodiments, the conveyor segment 100 may be a cart sorter.

In some embodiments, the conveyor segment 100 may include a belt 102. In some embodiments, the belt 102 may be a conveyor belt. In some embodiments, the belt 102 may be toothed and/or include one or more geared segments. In some embodiments, the belt 102 may be composed or rubber, plastic, or a composite material. In some embodiments, the belt 102 may be composed of polyvinyl chloride, polystyrene, rubber, polyester, and/or nylon. In some embodiments, the belt 102 may be combined with one or more layers of fabric.

In some embodiments, the conveyor segment 100 may include a frame 104. In some embodiments, the frame 104 may be a rigid, substantially rectangular frame across which the belt 102 may travel and/or be disposed. In some embodiments, the frame may be composed of metal, plastic, or a composite material. In some embodiments, the frame 104 may house one or more internal components of the conveyor segment 100 or of the larger conveyor system 10. In some embodiments, the frame 104 may be configured to protect one or more components of the conveyor segment 100.

Figure 1B:
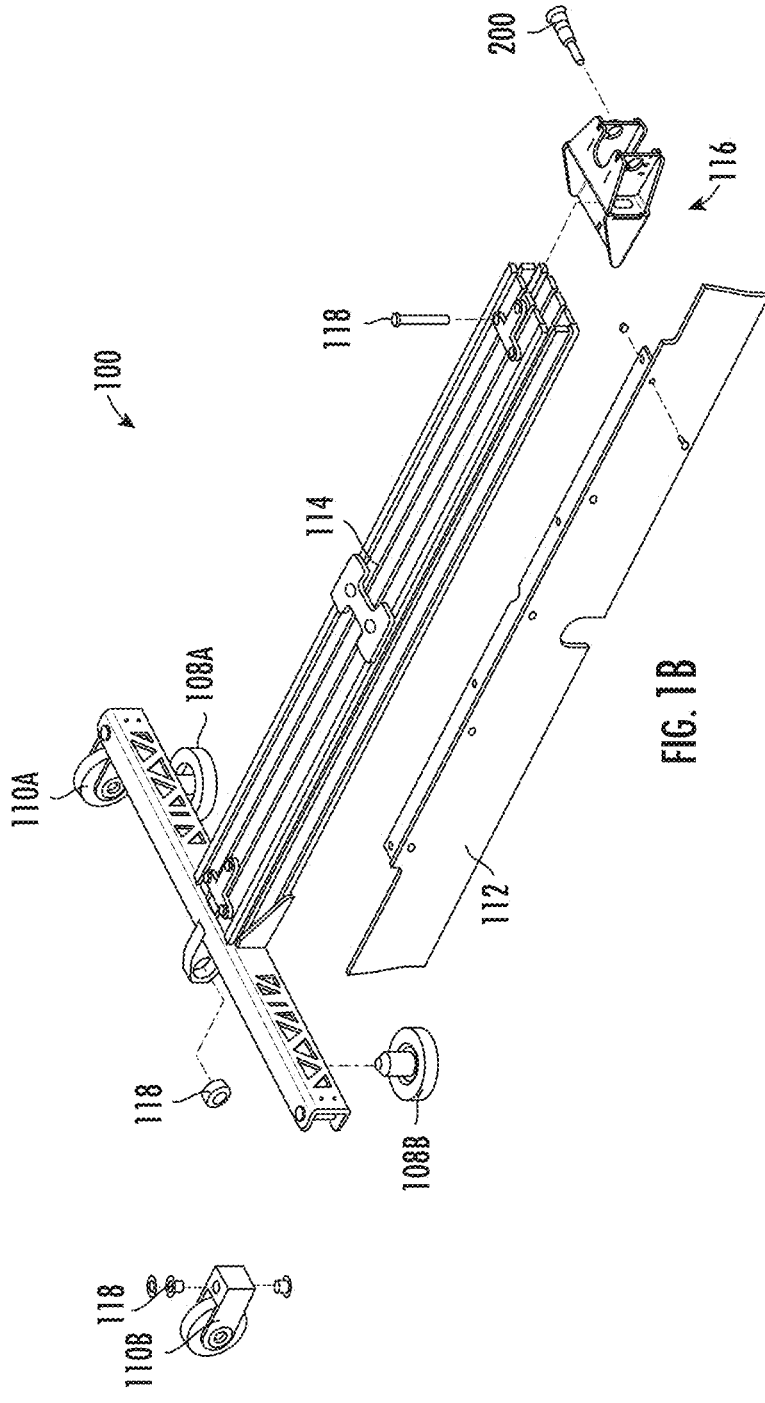
FIG. 1B is a top angle exploded view of an example conveyor segment in accordance with various embodiments of the present disclosure.

In some embodiments, and as shown in at least FIG. 1B, the frame 104 may define a fin 112 and a track 114. In some embodiments, the fin 112 may be disposed beneath the track 114. In some embodiments, the fin 112 may be a linear motor driven bridge. In some embodiments, the track 114 may be configured to support the belt 102. In some embodiments, the track 114 may be T-shaped or substantially cross-shaped. In some embodiments, the fin 112 and track 114 may be composed of the same materials as the frame 104. In some embodiments, alternate materials may be used for the fin 112 and/or the track 114, as desired.

In some embodiments, the conveyor segment 100 may be disposed on one or more supports 106A, 106B, as shown in at least FIG. 1A. In some embodiments, the conveyor segment 100 may be fixedly attached to one or more supports 106A-106B. In some embodiments, the one or more supports 106A-106B may be fixed to the floor of the aforementioned industrial environment.

In some embodiments, and as shown in at least FIG. 1B, the conveyor segment 100 may include one or more guider wheels 108A, 108B. In some embodiments, the guider wheels 108A, 108B may be used to properly position the conveyor segment 100 within the larger conveyor system 10, as desired. In some embodiments, the guider wheels 108A, 108B may be configured to reduce wear on the frame 104 or overall conveyor segment 100. In some embodiments, the guider wheels 108A, 108B may be composed of rubber or other suitable "soft" material.

In some embodiments, still referring to FIG. 1B, the conveyor segment 100 may include one or more wheel bearings 110A, 110B. Similar, though not identical, to the guider wheels 108A, 108B, the one or more wheel bearings 110A, 110B may be attached to the frame 104 and configured to reduce wear on the frame 104 or overall conveyor segment 100. In some embodiments, the one or more guider wheels 108A, 108B and the one or more wheel bearings 110A, 110B may include a wheel and bearing segment.

Figure 1C:
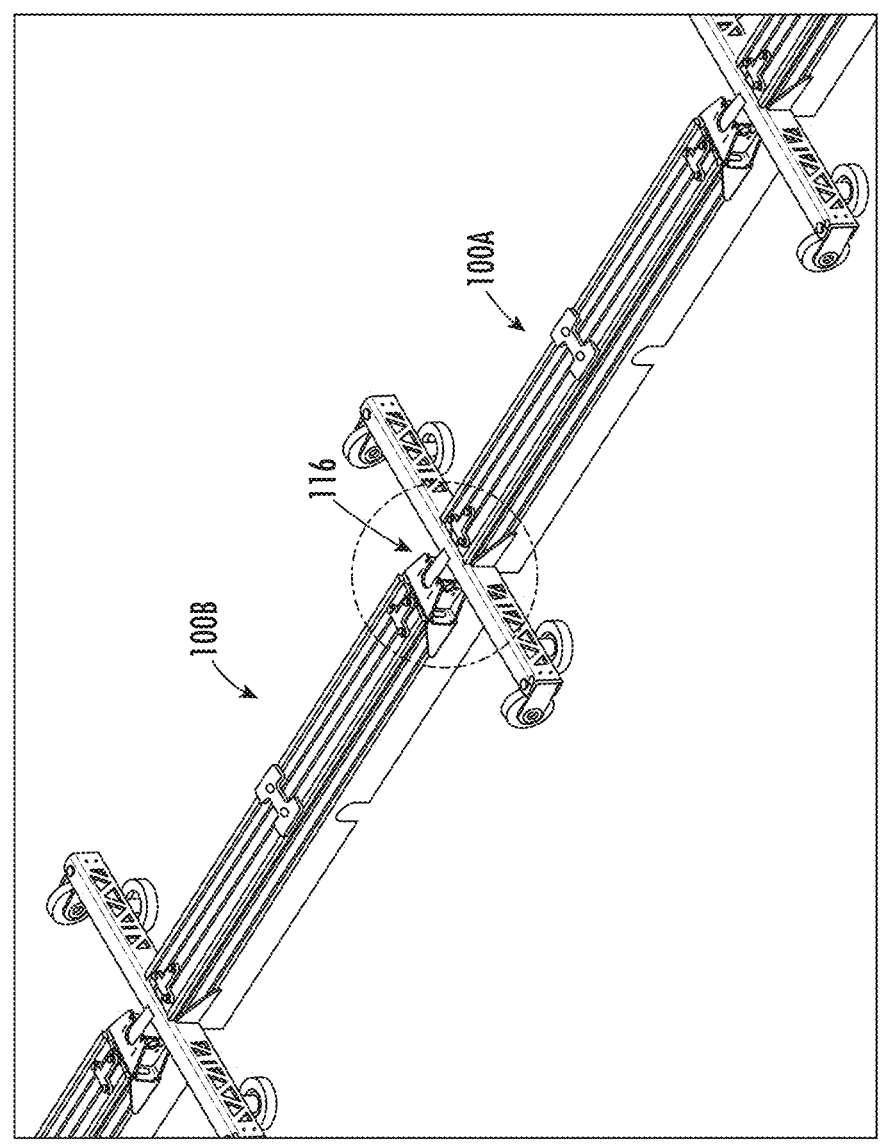
FIG. 1C is a top angle view of an example conveyor system in accordance with various embodiments of the present disclosure.
Figure 2A:
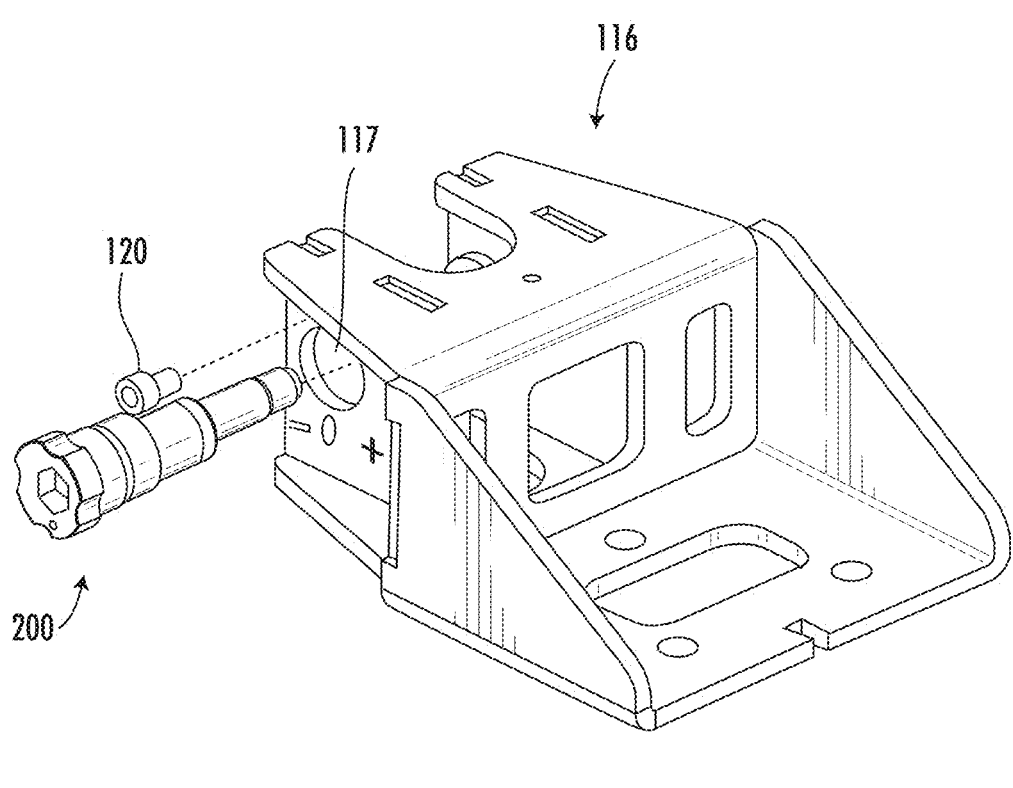
FIG. 2A is an exploded view of an example adjustment mechanism in accordance with various embodiments of the present disclosure.

In some embodiments, the conveyor segment 100 may include a hitch 116. In some embodiments, the hitch 116 may be configured to connect two conveyor segments 100A and 100B, as shown in FIG. 2A. Still referring to FIG. 2A, but also to FIGS. 2B and 2C, a hitch 116 may be used to operably connect two conveyor segments 100A, 100B (as shown in at least FIG. 1C). In some embodiments, and as will be described in greater detail later in this disclosure, an adjustment mechanism 200 may be disposed through one or more slots 117 of the hitch 116.

In some embodiments, the conveyor segment 100 may include one or more fasteners 118 (e.g., threaded screws, nuts and bolts, etc.). In some embodiments, the one or more fasteners 118 may be configured to secure various components of the conveyor segment 100 (e.g., the hitch 116 to the frame 104, the guider wheels 108A, 108B to the frame 104, and the one or more wheel bearings 110A, 110B to the frame 104).

Figure 1D:
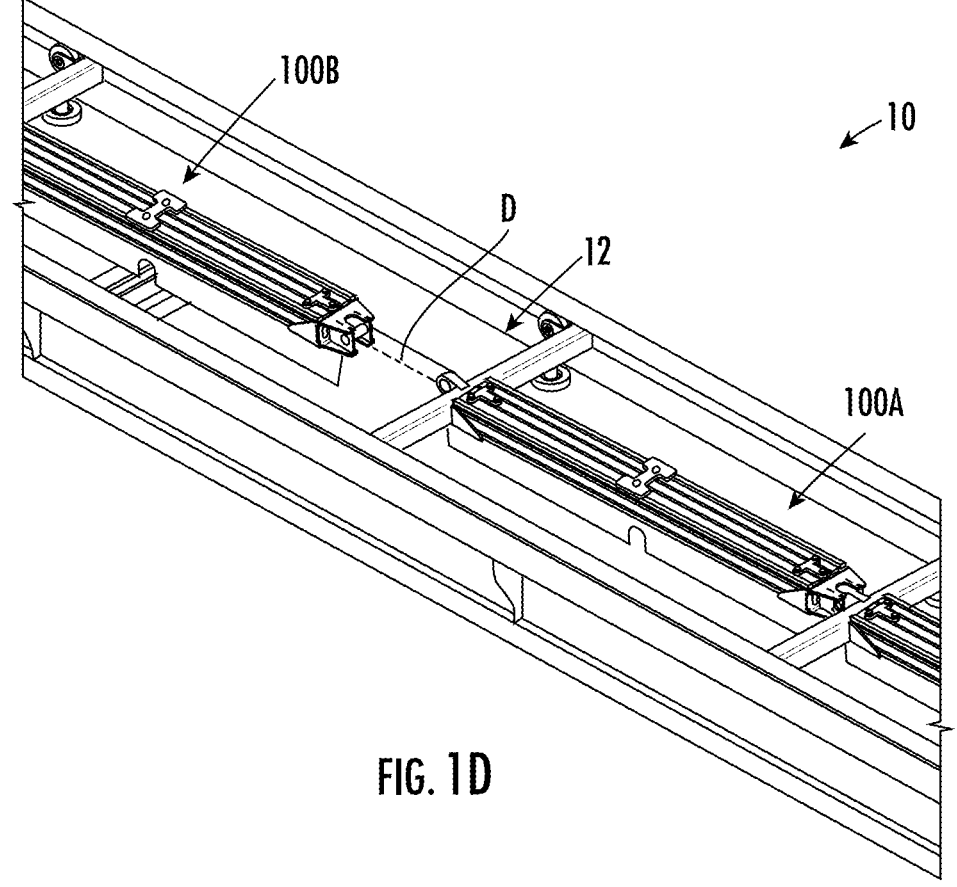
FIG. 1D is a top angle view of an example conveyor system in accordance with various embodiments of the present disclosure.

Referring now to FIG. 1D, in some embodiments, one or more conveyor segments 100A, 100B may be disposed on a track 12 of the conveyor system 10. In some embodiments, the one or more conveyor segments 100A, 100B may be installed in accordance with a sorter travel direction. In some embodiments, the conveyor system 10 may define a distance D between the one or more conveyor segments 100A, 100B. In some embodiments, the one or more conveyor segments 100A, 100B may be the first and last conveyor segments 100A, 100B within the larger conveyor system 10. In some embodiments, the distance D may then be distributed throughout the conveyor segments 100A, 100B, such that each conveyor segment may be adjusted to accommodate the distance D.

Example Adjustment Mechanisms

Figure 2B:
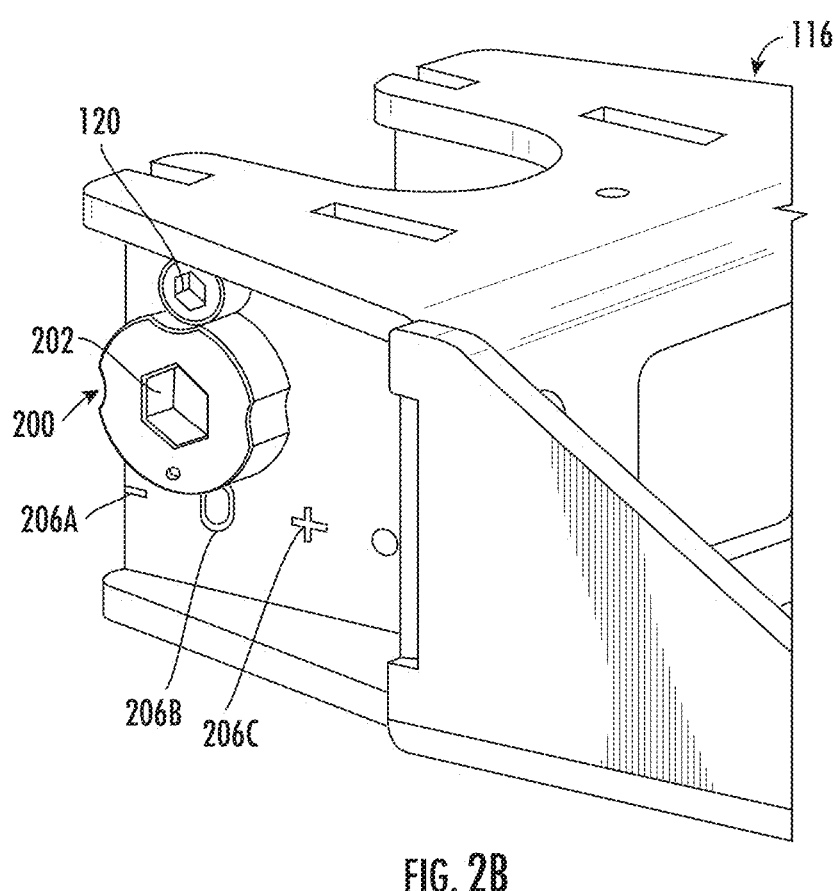
FIG. 2B is a side angle view of an example adjustment mechanism in accordance with various embodiments of the present disclosure.
Figure 2C:
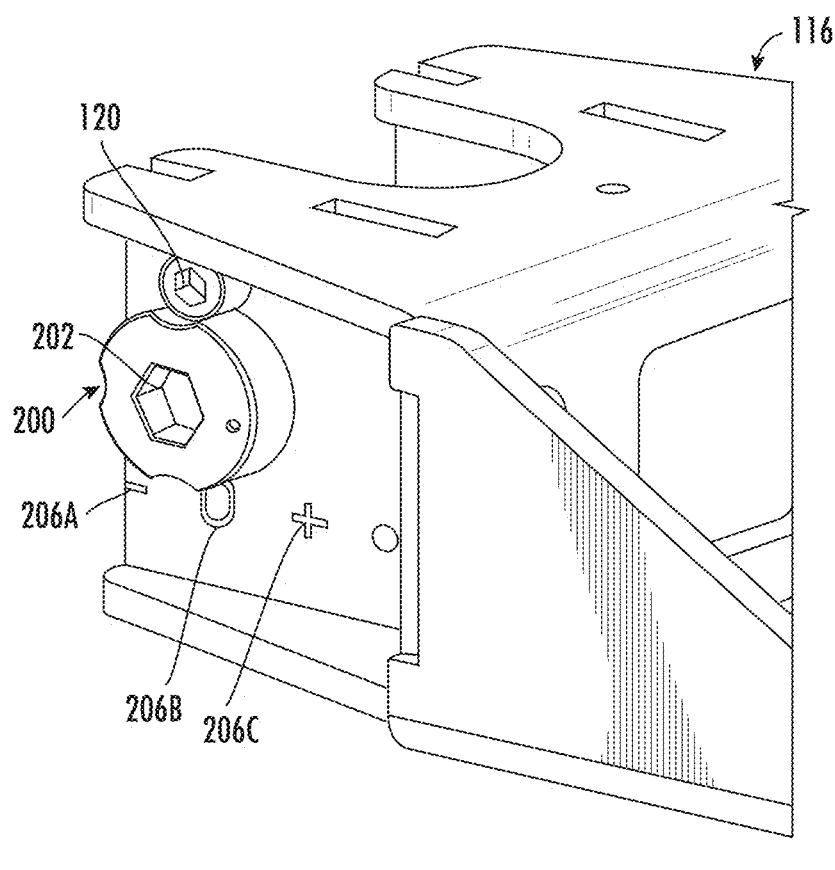
FIG. 2C is a side angle view of an example adjustment mechanism in accordance with various embodiments of the present disclosure.

Referring now to FIGS. 2A-2C, there is provided, according to various embodiments, an adjustment mechanism 200. In some embodiments, the adjustment mechanism 200 may be a substantially cylindrical, rigid piece including multiple surfaces. In some embodiments, the adjustment mechanism 200 may be composed of steel. In some embodiments, the adjustment mechanism 200 may be inserted into the hitch 116. In some embodiments, the adjustment mechanism 200 may be secured to the hitch 116 via one or more hitch fasteners 120 (e.g., a screw). In some embodiments, the one or more hitch fasteners 120 may be adjusted using a tool, such as an Allen wrench. In some embodiments, the adjustment mechanism 200 may be configured to adjust a length of the conveyor segment 100.

In some embodiments, and referring now to FIG. 2B, an adjustment mechanism 200 may include an adjustment slot 202. In some embodiments, the adjustment slot 202 may be a polygonal slot. In some embodiments, and as will be described in greater detail later in this disclosure, the adjustment mechanism 200 may be rotated by inserting a tool 204 (see, e.g., FIGS. 4A-4C) into the adjustment slot 202.

In some embodiments, one or more gauge elements 206A-206C may be disposed on the hitch 116. In some embodiments, the one or more gauge elements may include an indicator that the length of the conveyor segment 100 has been reduced (e.g., a minus or "−" sign) 206A, an indicator that the length of the conveyor segment 100 has not been altered (e.g., a zero or "0" sign) 206B, and an indicator that the length of the conveyor segment 100 has been increased (e.g., a plus or "+" sign) 206C. It will be understood that more or fewer gauge elements may be indicated on the hitch 116. For example, in some embodiments, the adjustment mechanism 200 may be adjusted between the zero indicator 206B and the increased indicator 206C, which may require a fourth gauge element. In some embodiments, when the adjustment mechanism 200 is first installed in the hitch 116 of the conveyor segment 100, the gauge indicator may be at the zero indicator 206B. From this position, the conveyor segment 100 may then be increased or decreased in length, as desired.

Referring now to FIG. 2C, the adjustment mechanism 200 may be rotated to the gauge element 206C, increasing the length of the conveyor segment 100 by one increment. In some embodiments, the increment may be 1 mm. In some embodiments, the increment may be greater than or less than 1 mm, as desired.

Figure 3A:
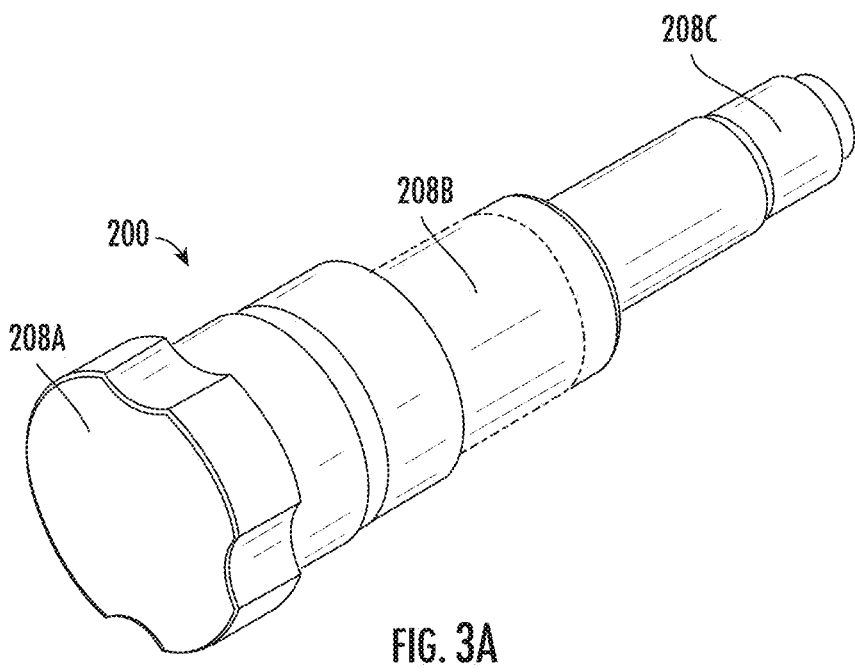
FIG. 3A is a front angle view of an example adjustment mechanism in accordance with various embodiments of the present disclosure.
Figure 3B:
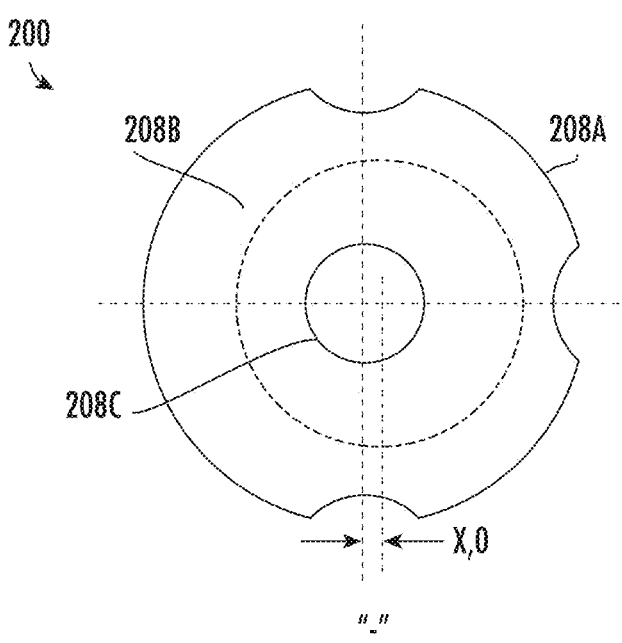
FIGS. 3B-3D are top plan views of an example adjustment mechanism in accordance with various embodiments of the present disclosure.
Figures 3C, 3D:
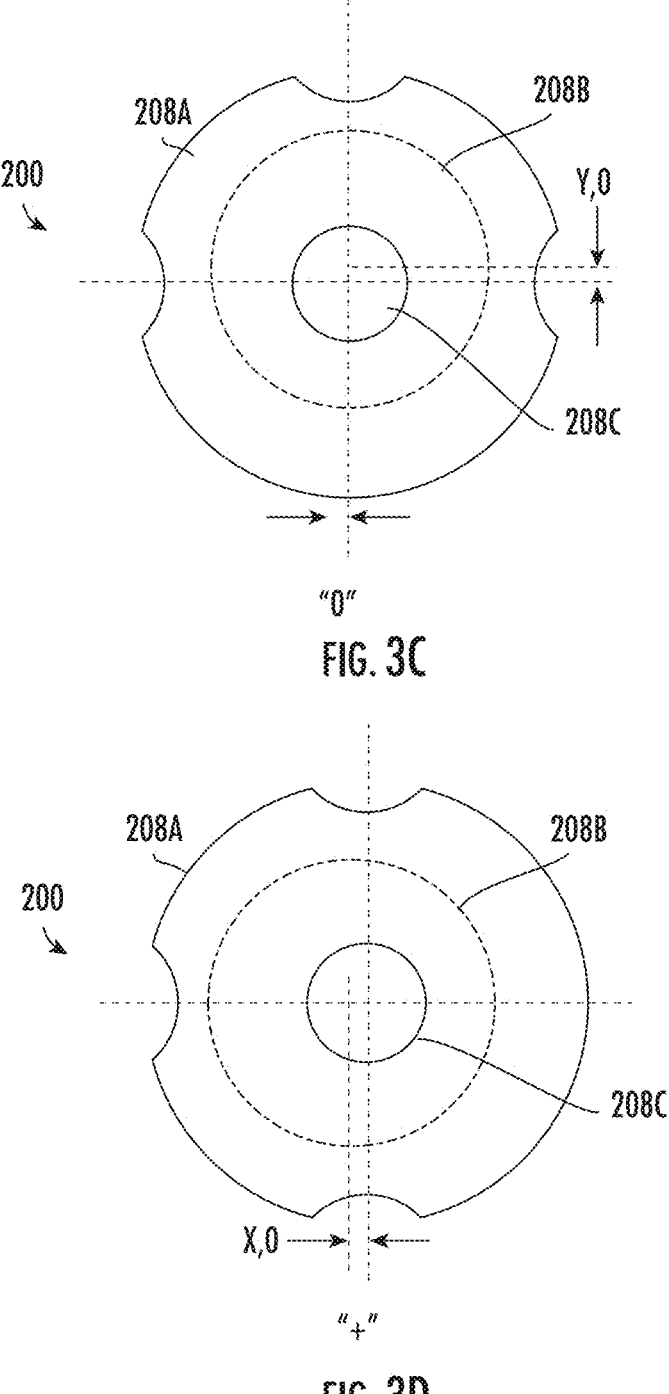

Referring now to FIGS. 3A-3D, the adjustment mechanism 200 may include a plurality of surfaces 208A-208C. It will be understood that the adjustment slot 202 has been excluded solely for the purpose of illustrating other features of adjustment mechanism 200. In some embodiments, the plurality of surfaces 208A-208C may have an eccentric design; that is, the plurality of surfaces 208A-208C may not share a centerline. As shown in FIGS. 3B-3D, the second surface 208B is slightly off-center from the first surface 208A. For example, in FIG. 3C, the centerline of the second surface 208B is located "up" a distance "Y" from the centerline of the other two surfaces 208A, C, while it is offset a distance "X" from the centerline of the other two surfaces in FIGS. 3B and 3D.

FIGS. 3B-3D further show, according to various embodiments, the adjustment mechanism 200 from a top plan view when the adjustment mechanism 200 has been used to decrease a length of the conveyor segment 100 (FIG. 3B), keep the conveyor segment 100 at the installed length (FIG. 3C), and to increase a length of the conveyor segment (FIG. 3D).

Figure 3E:
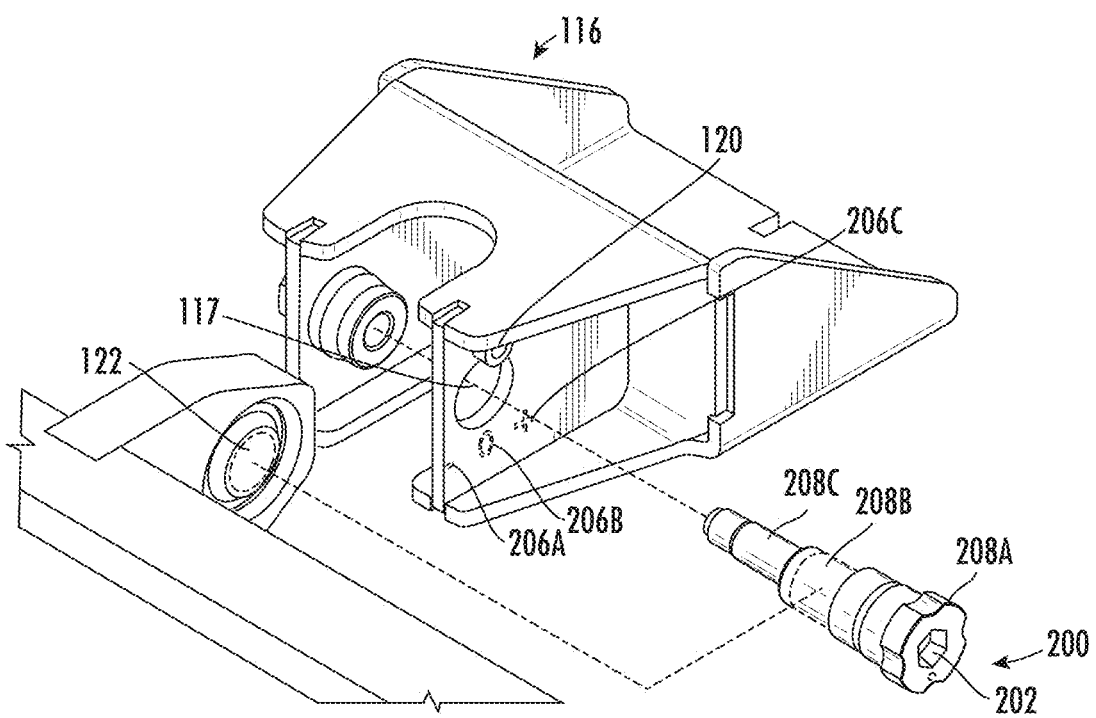
FIG. 3E is an exploded view of an example adjustment mechanism and an example hinge in accordance with various embodiments of the present disclosure.

FIG. 3E shows an attachment process for an example adjustment mechanism 200, according to various embodiments. In some embodiments, the adjustment mechanism 200 may be inserted into the slot 117 of the hitch 116. In some embodiments, the second surface 208B may be operably engaged with an adjustment point 122 of the conveyor segment 100. In some embodiments, the adjustment point 122 may be in fixed communication with a length of the conveyor segment 100; that is, compressing or extending the conveyor segment 100 at the adjustment point 122 may cause the conveyor segment 100 to increase or decrease in length. In some embodiments, the second surface 208B may contact the adjustment point 122 such that rotating the adjustment mechanism 200, as previously described, will cause the adjustment mechanism 200 to push or pull on the conveyor segment 100, thereby shortening or lengthening (respectively) the conveyor segment, as desired.

Figure 4A:
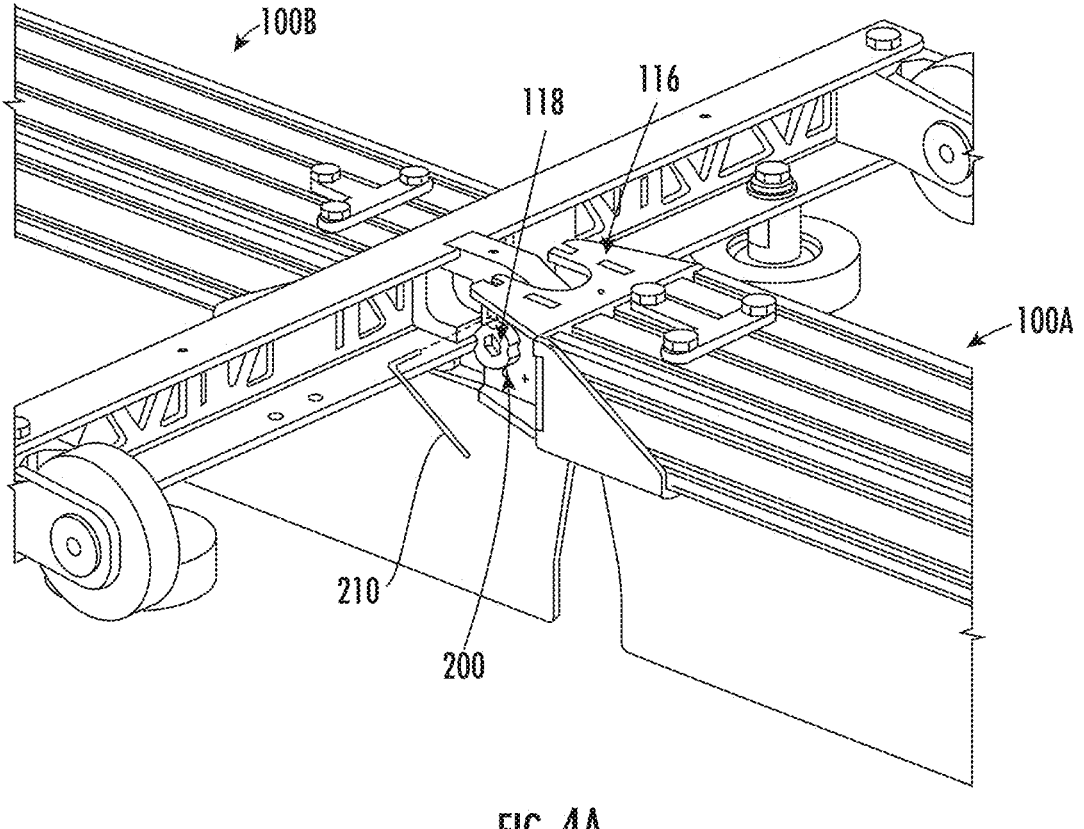
FIGS. 4A-4C are top angle views showing an example adjustment process for an example conveyor system in accordance with various embodiments of the present disclosure.
Figure 4B:
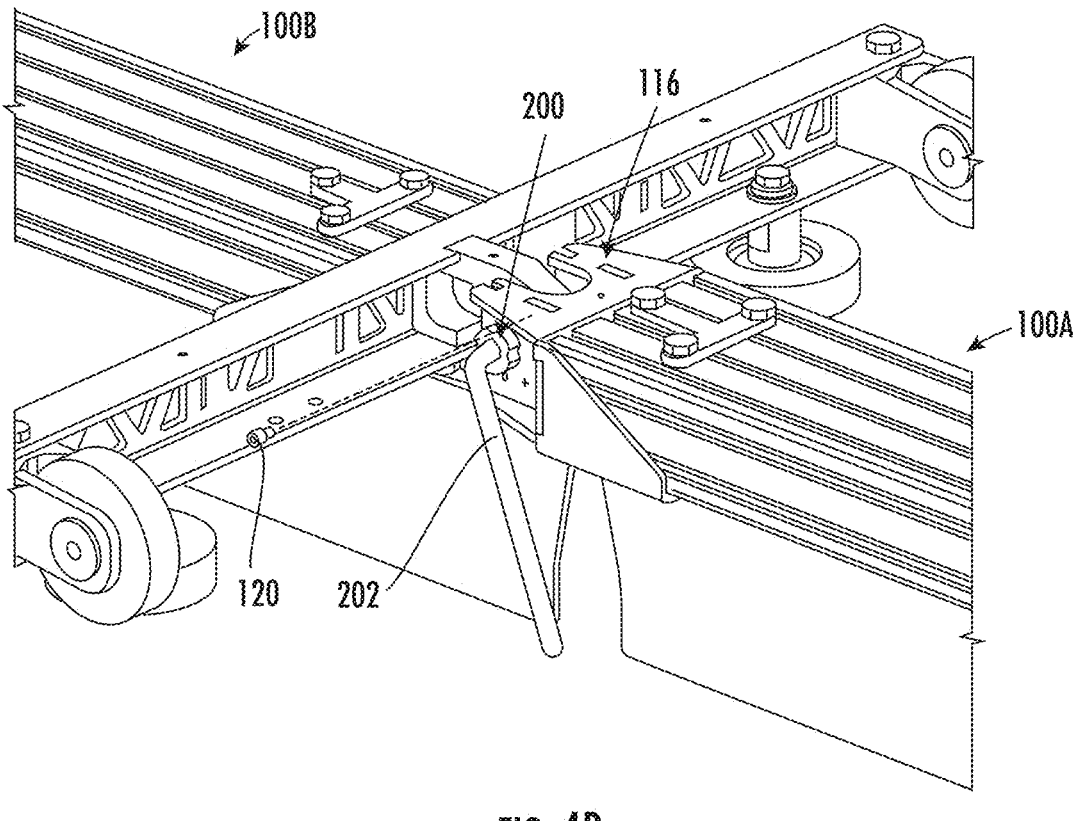
Figure 4C:
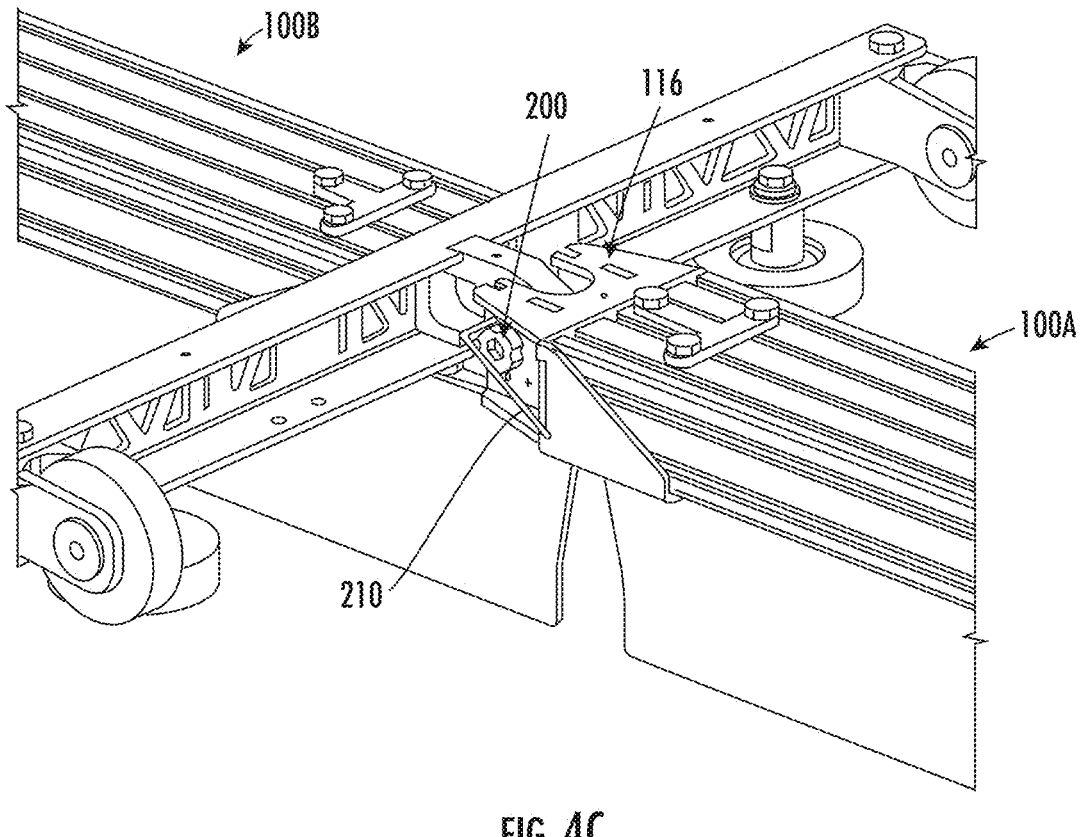

Referring now to FIGS. 4A-4C, an example process for adjusting a conveyor segment 100 using the adjustment mechanism 200 will be shown, according to various embodiments. As previously described, in some embodiments, the adjustment mechanism 200 may be inserted into the hitch 116 connecting a first conveyor segment 100A and a second conveyor segment 100B in order to adjust a length of a conveyor segment (segment 100A, as shown in the figures).

In some embodiments, a tool (e.g., an Allen wrench) 210 may be used to adjust the hitch fastener 120 securing the conveyor segment 100A to the hitch 116. In some embodiments, the hitch fasteners 120 may be removed (see FIG. 4B), allowing the adjustment mechanism 200 to rotate within the slot 117 of the hitch 116, and, as previously described, increase or decrease the length of the conveyor segment 100, as desired.

Figure 5A:
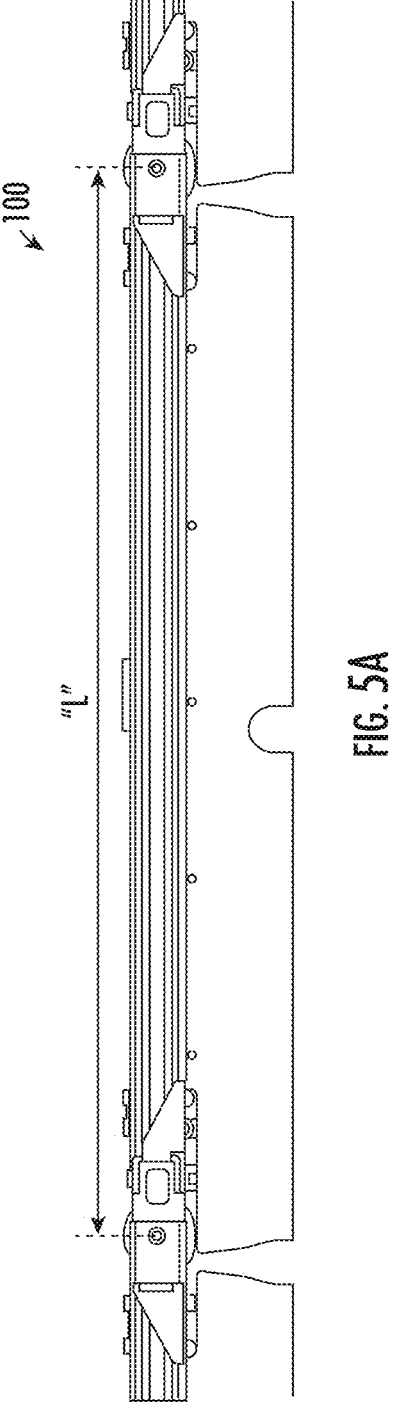
FIG. 5A is an elevation side view of an example conveyor system in accordance with various embodiments of the present disclosure.
Figure 5B:
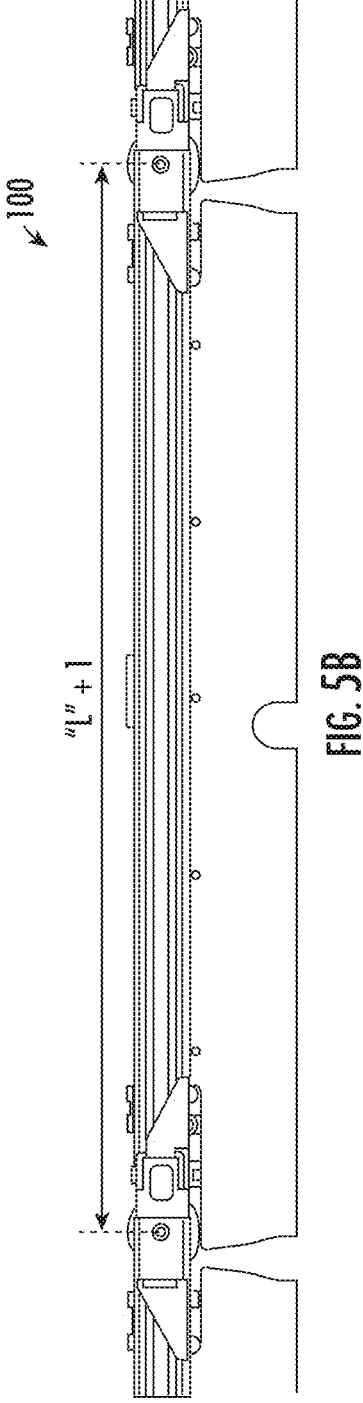
FIG. 5B is an elevation side view of an example conveyor system in accordance with various embodiments of the present disclosure.

FIGS. 5A and 5B show a side, elevation view of an example conveyor segment 100 with an example length "L." In some embodiments, the length L may be set when the conveyor segment 100 is installed. In some embodiments, the length L may be 1200 mm. It will be understood that the length L may be greater or less than 1200 mm in various embodiments.

In some embodiments, and as previously described, the length L may be increased by +1, as shown in FIG. 5B, via the adjustment mechanism 200. In some embodiments, the +1 may indicate +1 mm. In some embodiments, the units of increase may be greater or less than a millimeter. In some embodiments, the increments may be discrete integers (e.g., +1). In some embodiments, the increments may be quantities of integers (e.g., +0.5).

Example Methods of Use

FIG. 6 shows an example method 300 of use for an example adjustment mechanism, according to various embodiments. In some embodiments, the method 300 may be implemented with reference to the conveyor segment 100 and adjustment mechanism 200 and their various components as previously described. In some embodiments, the method 300 may be implemented using any suitable mechanism and device and their various components.

In some embodiments, the method 300 may include a step 302 of unfastening, by a tool, one or more hitch fasteners, such that an adjustment mechanism may be rotated relative to a hitch connecting a first conveyor segment to a second conveyor segment. In some embodiments, the method 300 may include a step 304 of adjusting, by the tool, the adjustment mechanism, such that the adjustment mechanism increases a conveyor length of the first conveyor segment by one increment. In some embodiments, the method 300 may include a step 306 of fastening, by the tool, the one or more hitch fasteners, such that the adjustment mechanism is secured to the hitch.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A conveyor system comprising:
   a track defining a track length;
   two or more conveyor segments, wherein each conveyor segment comprises:
      a belt;
      a frame configured to support the belt;
      a hitch configured to operably connect the two or more conveyor segments, wherein the hitch comprises one or more slots, and wherein an adjustment mechanism is disposed through one of the one or more slots;
      an adjustment point,
      wherein each conveyor segment defines a conveyor length; and
      the adjustment mechanism corresponds to an elongated, substantially cylindrical piece defining a plurality of surfaces,
         wherein at least one surface of the plurality of surfaces is concentric about a different axis than other surfaces of the plurality of surfaces,
         wherein the at least one surface is configured to operably engage with the adjustment point such that the adjustment mechanism is rotatable in a first direction to increase the conveyor length by one increment and in a second direction to decrease the conveyor length by the one increment.

2. The conveyor system of claim 1, wherein each conveyor segment further comprises one or more hitch fasteners configured to fixedly attach the adjustment mechanism to the hitch.

3. The conveyor system of claim 1, further comprising a gauge comprising one or more gauge elements, wherein the one or more gauge elements are disposed on the hitch, wherein the adjustment mechanism is rotatable in the first direction to a first gauge element of the one or more gauge elements, and the adjustment mechanism is rotatable in the second direction to a second gauge element of the one or more gauge elements.

4. The conveyor system of claim 1, wherein the track length ranges between 2.5 and 3.5 meters.

5. The conveyor system of claim 1, wherein the conveyor length ranges between 1195 and 1205 millimeters.

6. The conveyor system of claim 1, wherein the one increment is 1 millimeter.

7. The conveyor system of claim 1, wherein the adjustment mechanism comprises an eccentric design.

8. The conveyor system of claim 3, wherein, when the adjustment mechanism is installed in the conveyor system, the adjustment mechanism is rotatable to a third gauge element of the one or more gauge elements.

9. The conveyor system of claim 1, wherein the conveyor system is a cross-belt conveyor.

10. The conveyor system of claim 1, wherein the conveyor segment is a cart.

11. A method of using an adjustment mechanism, the method comprising:
   unfastening, by a tool, one or more hitch fasteners, such that the adjustment mechanism may be rotated relative to a hitch connecting a first conveyor segment to a second conveyor segment, wherein the adjustment mechanism corresponds to an elongated, substantially cylindrical piece defining a plurality of surfaces, and wherein the hitch comprises one or more slots, wherein the adjustment mechanism is disposed through one of the one or more slots;

adjusting, by the tool, the adjustment mechanism, such that the adjustment mechanism increases a conveyor length of the first conveyor segment by one increment; and fastening, by the tool, the one or more hitch fasteners, such that the adjustment mechanism is secured to the hitch.

12. The method of claim 11, further comprising:

unfastening, by the tool, the one or more hitch fasteners, such that the adjustment mechanism may be rotated relative to the hitch connecting the first conveyor segment to the second conveyor segment;

adjusting, by the tool, the adjustment mechanism, such that the adjustment mechanism decreases the conveyor length of the first conveyor segment by the one increment; and fastening, by the tool, the one or more hitch fasteners, such that the adjustment mechanism is secured to the hitch.

13. The method of claim 11, wherein the one increment is 1 millimeter.

\* \* \* \* \*